May 7, 1940.  W. G. STEVENS, JR  2,199,422
PLANTER
Filed March 12, 1938  3 Sheets-Sheet 2
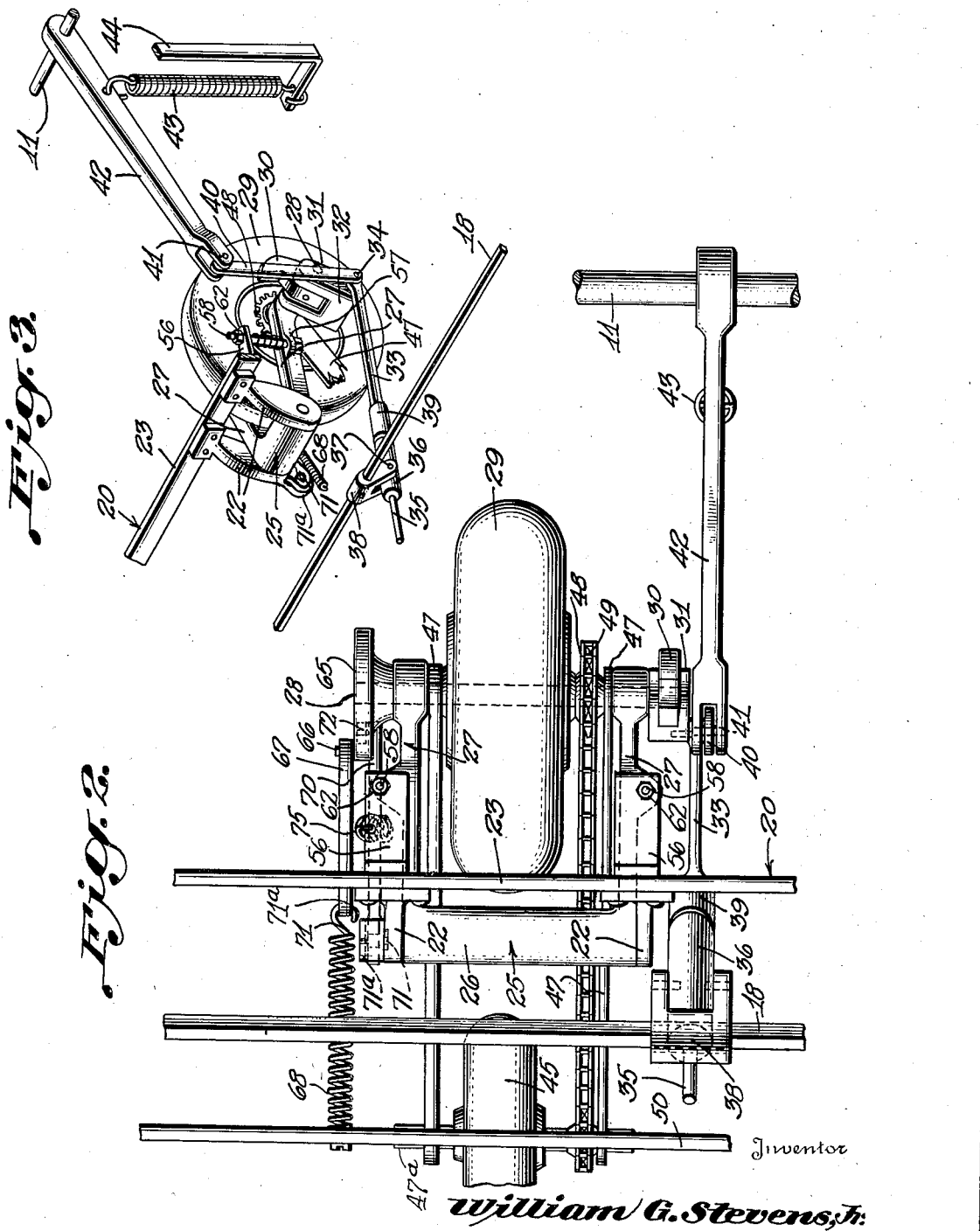

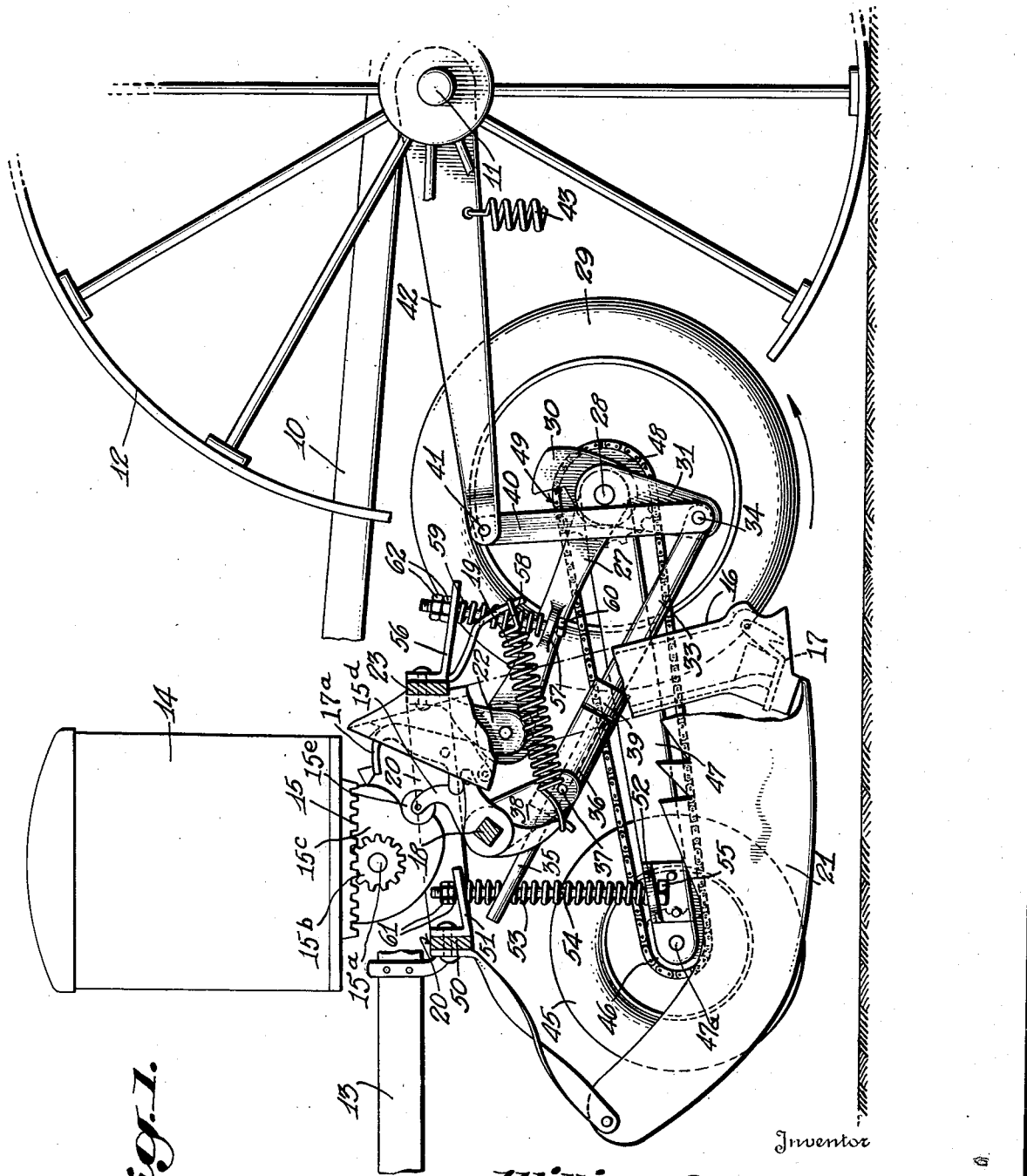

Patented May 7, 1940

2,199,422

UNITED STATES PATENT OFFICE 2,199,422

PLANTER

William G. Stevens, Jr., Sykesville, Md.

Application March 12, 1938, Serial No. 195,650

19 Claims. (Cl. 111—34)

This invention relates to improvements in wireless check-row planters, and is especially applicable to planters of that type having blade runners or discs for opening the soil, and boots for depositing seed therein.

It is well known that the planters most generally used require a wire for checking the rows. Such wire is stretched across the field and staked at each end. It requires considerable time and effort to unreel and reel the wire and reset the stakes at the end of each row each time the planter is turned. Furthermore, it retards the speed at which all other parts of the planter normally operate. Delays cause considerable inconvenience and annoyance, as the planting season is short and weather conditions often interfere.

In the past, several attempts have been made to eliminate the check wire of the planter. These attempts have not met with success due to the fact that although the principle may have been discovered, practical means for accomplishing the desired result were not provided. It is old in planters of the type referred to to use an auxiliary ground-engaging wheel directly and operatively connected to the seed valves of the planting mechanism. Levers, gears, links, or the like, have been suggested as suitable means to connect the ground wheel to the seed-planting valves.

The primary purpose of my invention is to provide a practical mechanism capable of accomplishing the desired result in a simple, relatively inexpensive manner.

In my invention I utilize a ground-engaging wheel or wheels indirectly associated with the seed valves of the planter but such ground wheel means is not used to operate the seed valves. A spring is operatively connected to such valves and it should be noted that rotary motion of the ground wheel means is utilized to produce tension in a spring to be released subsequently, to instantaneously actuate the seed valves each time the ground wheel means rotates a predetermined degree as the planter moves forwardly.

With the foregoing objects outlined and with other objects in view, the invention consists in the novel features hereinafter described in detail, illustrated in the accompanying drawings, and more particularly pointed out in the appended claims.

In the drawings:

Fig. 1 is a fragmentary side elevation of a portion of a corn planter showing in side elevation a portion of my improvements attached thereto; the other portion of such improvements which is arranged behind the illustrated portion being omitted to facilitate illustration.

Fig. 2 is a fragmentary top plan view of my improved mechanism showing the manner in which it is attached to the planter.

Fig. 3 is a fragmentary view of a portion of the structure shown in Fig. 2; the other portion being omitted to aid the disclosure of the invention.

Figure 4:
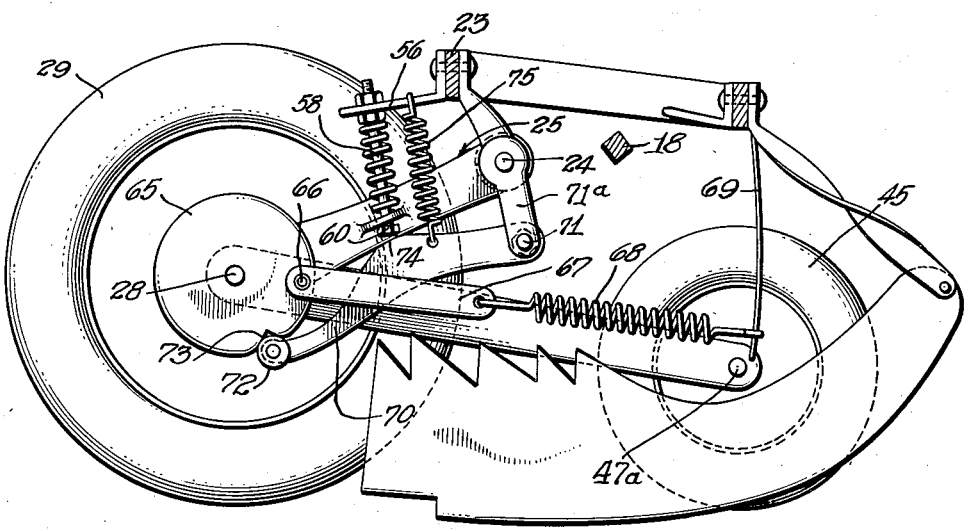
Fig. 4 is a side elevation of a portion of my improved mechanism taken from the side opposite that of Fig. 1 and with the mechanism in elevated position. The portion of the mechanism behind that illustrated in this figure is omitted.
Figure 5:
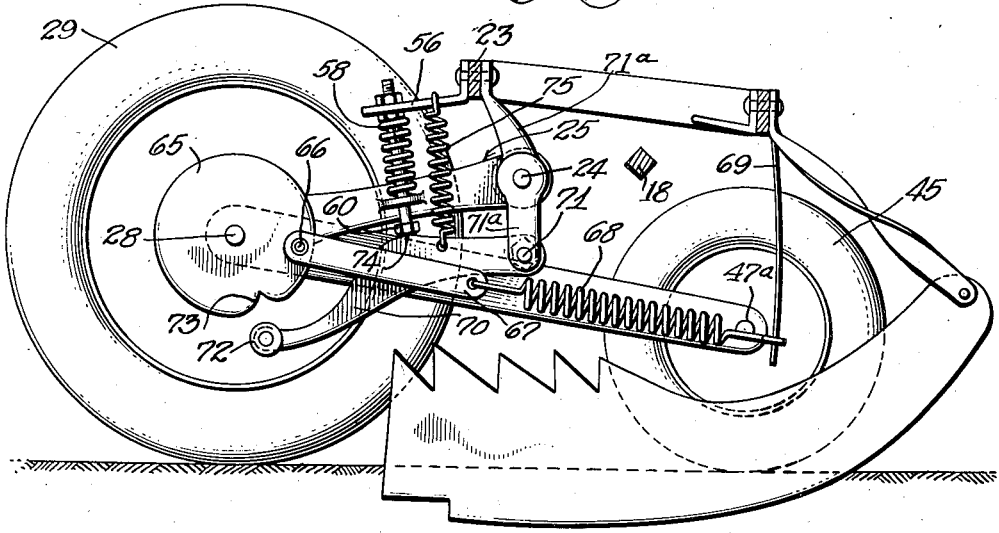
Fig. 5 is a view like Fig. 4, but showing the mechanism illustrated in that figure in lowered position.

Referring to Fig. 1 of the drawings, 10 designates the frame of a well-known type of check-row planter as now in general use and having a main axle 11 supported by the wheels 12. The main frame is attached to the runner frame 20 in such a way that the runners 21 can be lowered or elevated by the operator as desired. Conventional seed hoppers 14 have seed plates (not shown) attached to the gears 15 in the usual way. A drill shaft 15a is provided with pinions 15b which operate the gears 15 in the customary manner. The drill shaft also supports a clutch 15c controlled by a trip arm 15d and roller 15e on the check shaft 18 as is customary. A check spring 19 acts to hold the shaft 18 in normal position as shown in Fig. 1 with the trip roller contacting said clutch. In this type of planter seed is deposited in the furrows opened by the runners 21 only at the time that the check shaft 18 is oscillated. The seed plates in the hoppers 14 together with their associated mechanism function to deliver seed from the hoppers to the lower ones of the boot valves 17 at the proper time. As is conventional, each boot 16 also has an upper seed valve 17a operated from the check shaft 18.

The planter has a tongue 13 by which it is drawn over the field.

The parts set forth above are used in connection with my improvements which will now be described.

Legs or brackets 22 forming supporting means have their upper ends fixedly secured to the rear bar 23 (Fig. 3) of the runner frame and their lower portions are pivotally connected at 24 to a yoke 25 consisting of a horizontal cross bar 26 and rearwardly extending arms 27. An axle 28 is journalled in the rear ends of the said arms and is fixedly connected to a ground wheel 29 preferably having a rubber tire to provide maximum friction with the ground over which the planter travels.

The axle 28 (see Fig. 2) extends outwardly at both ends beyond the arms of the yoke and one of its end portions is provided with a first member or arm 30 (Fig. 1) that is fixed to the shaft. This arm cooperates with an auxiliary yoke or second member 31 forming a toggle link pivotally mounted on the same end portion of the shaft and having a cross head 32 adapted to be struck by the arm to cause the auxiliary yoke to rotate with the arm during a portion of the revolution of the shaft 28. A link 33 has one of its ends pivotally connected to the toggle member 31 by a pin 34, and the opposite or forward end of the link is preferably provided with a pin or extension 35, slidable in a sleeve 36, pivotally connected at 37 to a bracket 38, fixedly secured to the check shaft 18 of the planter. The end portion 39 of the link adjacent the extension 35 forms an abutment to move the sleeve 36 forwardly, and the telescopic joint provided by the parts 35 and 36 allows the link to move rearwardly to some extent independently of the sleeve.

Another toggle link 40 has its lower end pivotally connected to the pin 34 and its upper end pivotally connected at 41 to a lever 42 which is preferably pivoted at its rear end on the wheel axle of the planter. An energy-storing element, such as a coil spring 43, acts to pull the lever downwardly, and the upper end of the spring is connected to the lever and its lower end is connected to the lower end of a bracket 44 which has its upper end secured to the frame of the planter.

For additional traction purposes, I preferably provide a second smaller rubber-tired wheel 45 arranged forwardly of the wheel 29. The axle of the wheel 45 is not only fixed thereto but it is also fixed to a sprocket wheel 46. Rigid bars 47 have their rear ends pivotally connected to the shaft 28 and have their front ends pivotally connected to the axle 47a of the wheel 45. A sprocket 48 is fixed to the shaft 28, and a sprocket chain 49 connects the two sprocket wheels to cause the shafts 28 and 47a to travel in unison. As the result, movement will be imparted positively to the shaft 28 while the planter is travelling over rough ground, even if the wheel 29 is unable to obtain traction during such movement.

In order to yieldingly hold both wheels in contact with the ground when the planter is in operation, I preferably provide the front bar 50 of the runner frame with rearwardly extending apertured ears 51, and I provide the bars 47 with similar ears 52. Bolts 53 connect the ears 51 and 52, and coil springs 54 are arranged on the bolts between said ears. Of course, the springs act to yieldingly force the wheel 45 downwardly when the runner frame 20 is in its lower position. The heads 55 of the inverted bolts act to lift the wheel 45 when the runner frame 20 is elevated.

Other apertured ears 56 are rigidly connected to the rear bar 23 of the runner frame and project rearwardly therefrom. The arms 27 of the yoke 25 also have apertured ears 57. Inverted bolts 58 connect the ears 56 and 57, and coil springs 59 also surround these bolts, and act to yieldingly press the wheel 29 into contact with the ground when the runner frame is lowered. The heads 60 of the bolts 58 cooperate with the ears 57 to lift the rear frame when the runner frame is elevated. Nuts 61 and 62 arranged respectively on the bolts 53 and 58, are employed not only to support the bolts on the ears 51 and 56 but to adjust the tension of the springs 54 and 59.

In reference to the operation of the mechanism so far described, it will be understood that if the runner frame is lowered and the tandem wheels 29 and 45 are permitted to contact with the ground, then as the wheels travel forwardly, the arm 30 will engage the auxiliary yoke 31 and turn it with the shaft 28 until the axis of the pin 34 reaches a position where it is intersected by a straight line joining the axes of shaft 28 and pivot 41. For purposes of disclosure, let it be assumed that this is the dead center position of my toggle mechanism (31, 40). Immediately the axis of pin 34 moves forwardly beyond dead center, the spring 43 (which has been stretched due to the rise of the link 40) comes into play and instantaneously snaps the forward end of the lever 42 downwardly with the result that the abutment 39 of link 33 suddenly strikes the sleeve 36 and moves the lower end of the bracket 38 forwardly. As the bracket is fixed to the check shaft 18 of the planter, the latter will function to actuate the valve mechanism 17 of the planter to drop seed from the boots 16. Then the check shaft spring 19 will instantaneously operate to return the check shaft to normal position and the rod 33 will return the auxiliary yoke 31 to its lowermost position, if the latter has not already moved to such position due to gravity.

In the next cycle, the arm 30 will again catch up with the auxiliary yoke 31 and the operation will be repeated.

To secure accuracy and insure that the mechanism starts to operate with the parts in predetermined positions, each time the runner frame is lowered, I provide the shaft 28 at its end opposite that where the arm 30 is attached, with a cam disc 65, fixed to the shaft 28. The disc is pivotally connected at 66 to the rear end of a link 67, the forward end of the latter being connected by a coil spring or energy-storing member 68 to a rigid bracket or leg having its upper end rigidly secured to the front bar of the runner frame. Obviously if the runner frame is lifted, the spring 68 will function to rotate the disc 65 into a position where the spring 68 and link 67 are in a straight line passing through the pivot 66 and shaft 28. The spring 68 also functions to resist the turning movement of the cam 65 for approximately one hundred and eighty degrees and then acts to pull on the pivot pin 66 of the cam to assist in rotating the wheel 29 for the remaining one hundred and eighty degrees. During the later movement, as the cam 65 and member 30 are fixed to the shaft 28, the spring 68 will assist the wheel 29 in causing stretching of the spring 43 or in storing energy in the latter spring. It will thus be seen that the wheel 29 in turning the first one hundred and eighty degrees in each cycle will be resisted by the relatively weak spring 68 and during the remaining one hundred and eighty degrees of the cycle will be assisted by such spring in storing energy in the spring 43, which cooperates with the toggle mechanism in instantaneously moving the check shaft 18.

For locking purposes, a lever 70 has its forward end pivotally connected at 71 to an extension 71a depending from one of the brackets 22, and the rear end of the lever carries a roller 72 designed to roll on the periphery of the disc 65 and to coact with a notch 73 in the disc. A coil spring 75 which connects the lever to one of the ears 56 acts to yieldingly pull the lever upwardly, and there is an abutment 74 at the medial portion of the lever which is arranged below the head 60 of one of the bolts 58. Consequently when the runner frame is lowered, the head of this bolt will engage the abutment 74 and will move the rear end of the lever downward so that the roller 72 will move away from the notch 73 and not interfere with the operation of the parts while the machine is planting.

It will be understood that the equipment shown is in illustration and not in limitation, and that various alternative means may be adopted within the scope of the appended claims, in which it is my intention to claim broadly all novelty inherent in the invention.

What I claim and desire to secure by Letters Patent is:

1. The combination of a planter having seed hoppers, seed boots, upper and lower valves for controlling the discharge of seed from the boots, and a check shaft for controlling said valves, of auxiliary ground wheel means connected to the planter and adapted to turn due to contact with the ground as the planter moves forwardly, and means operatively connecting the wheel means and shaft for causing instantaneous movement of the shaft in one direction to cause actuation of the valves each time the ground wheel means rotates a predetermined degree as the planter moves forwardly.

2. The combination of a planter having seed hoppers, seed boots, valves for controlling the discharge of seed from the boots, and means for controlling said valves, of a rotatable shaft operatively connected to the planter, an auxiliary ground wheel fixed to the shaft and adapted to turn due to contact with the ground as the planter moves forwardly, a first member fixed to the shaft and rotatable in unison with the wheel, a second member loosely mounted on the shaft and adapted to be engaged by the first member for turning the second member in unison with the wheel during a portion of the revolution of the latter, energy-storing means operatively connected to the second member, and means operatively connecting the second member and the means for controlling said valves for causing instantaneous actuation of the valves each time the ground wheel rotates a predetermined degree as the planter moves forwardly.

3. The combination of a planter having seed hoppers, seed boots, valves for controlling the discharge of seed from the boots, and means for controlling said valves, of a rotatable shaft operatively connected to the planter, an auxiliary ground wheel fixed to the shaft and adapted to turn due to contact with the ground as the planter moves forwardly, a first member fixed to the shaft and rotatable in unison with the wheel, a second member loosely mounted on the shaft and adapted to be engaged by the first member for turning the second member in unison with the wheel during a portion of the revolution of the latter, energy-storing means operatively connected to the second member, and means operatively connecting the second member and the means for controlling said valves for causing instantaneous actuation of the valves each time the ground wheel rotates a predetermined degree as the planter moves forwardly, said first member consisting of an arm projecting from the shaft and the second member consisting of a yoke to be engaged by the arm.

4. The combination of a planter having seed hoppers, seed boots, valves for controlling the discharge of seed from the boots, and means for controlling said valves, of a rotatable shaft operatively connected to the planter, an auxiliary ground wheel fixed to the shaft and adapted to turn due to contact with the ground as the planter moves forwardly, a first member fixed to the shaft and rotatable in unison with the wheel, a second member loosely mounted on the shaft and adapted to be engaged by the first member for turning the second member in unison with the wheel during a portion of the revolution of the latter, energy-storing means operatively connected to the second member, and means operatively connecting the second member and the means for controlling said valves for causing instantaneous actuation of the valves each time the ground wheel rotates a predetermined degree as the planter moves forwardly, the means which operatively connects the second member to the means for controlling the valves including a telescopic joint.

5. The combination of a planter having seed hoppers, seed boots, valves for controlling the discharge of seed from the boots, and means for controlling said valves, of a rotatable shaft operatively connected to the planter, an auxiliary ground wheel fixed to the shaft and adapted to turn due to contact with the ground as the planter moves forwardly, a first member fixed to the shaft and rotatable in unison with the wheel, a second member loosely mounted on the shaft and adapted to be engaged by the first member for turning the second member in unison with the wheel during a portion of the revolution of the latter, energy-storing means operatively connected to the second member, and means operatively connecting the second member and the means for controlling said valves for causing instantaneous actuation of the valves each time the ground wheel rotates a predetermined degree as the planter moves forwardly, the means which operatively connects the second member to the means for controlling the valves including a rockable arm, a sleeve pivotally connected to the arm and a link pivotally connected at one end to the second member and slidably connected at its opposite end to said sleeve.

6. The combination with a planter having seed hoppers, seed boots, valves for controlling the discharge of seed from the boots, and means for controlling said valves, of a rotatable shaft operatively connected to the planter, an auxiliary ground wheel fixed to the shaft and adapted to turn due to contact with the ground as the planter moves forwardly, a first member fixed to the shaft and rotatable in unison with the wheel, a second member loosely mounted on the shaft and adapted to be engaged by the first member for turning the second member in unison with the wheel during a portion of a revolution of the latter, energy-storing means carried by the planter, a toggle device operatively connecting the energy-storing means and the second member, and means operatively connecting the second member and the means for controlling said valves for causing instantaneous actuation of the valves each time the ground wheel rotates a predetermined degree as the planter moves forwardly.

7. The combination of a planter having seed hoppers, seed boots, valves for controlling the discharge of seed from the boots, means for controlling said valves, and an elevatable runner frame, of auxiliary ground wheel means connected to the runner frame and adapted to turn due to contact with the ground as the planter moves forwardly, said auxiliary ground wheel means being movable upwardly out of contact with the ground when the runner frame is elevated, an energy-storing device carried by the planter and operatively connected to the wheel means and adapted to store energy due to the rotation of the wheel means, means operatively connecting the energy-storing means to the means for controlling said valves for causing instantaneous movement of the last-mentioned means to cause actuation of the valves each time the ground wheel means moves a predetermined degree as the planter moves forwardly, and means operatively connected to the ground wheel means for causing the latter to rotate to a predetermined position each time the ground wheel means is lifted from the ground due to elevation of the runner frame.

8. The combination with a planter having seed hoppers, seed boots, valves for controlling the discharge of seed from the boots, means for controlling said valves, and an elevatable runner frame, of a yoke pivotally suspended from the runner frame, of auxiliary ground wheel means rotatably connected to the yoke and adapted to turn due to contact with the ground as the planter moves forwardly, yielding means operatively connecting the runner frame to the yoke for urging the ground wheel means into contact with the ground, an energy-storing device operatively connected to the wheel means and adapted to store energy due to the rotation of the wheel means, and means operatively connecting the energy-storing means to the means for controlling said valves for causing instantaneous movement of the last-mentioned means to cause actuation of the valves each time the ground wheel means rotates a predetermined degree as the planter moves forwardly.

9. The combination of a planter having seed hoppers, seed boots, valves for controlling the discharge of seed from the boots, means for controlling said valves, and a runner frame, of yieldable supporting means depending from the runner frame, front and rear axles journalled in said supporting means, front and rear ground wheels fixed respectively to said axles, means operatively connecting the axles for causing them to turn in unison due to contact of either wheel with the ground as the planter moves forwardly, an energy-storing device carried by the planter and operatively connected to one of said axles and adapted to store energy due to the rotation of the last-mentioned axle, and means operatively connecting the energy-storing means to the means for controlling said valves for causing instantaneous movement of the last-mentioned means to cause actuation of the valves each time either one of said wheels rotates a predetermined degree as the planter moves forwardly.

10. The combination with a planter having seed hoppers, a plurality of seed boots, upper and lower valves for controlling the discharge of seeds from the boots, and a check shaft for controlling said valves, of auxiliary tandem ground wheels common to both boots, connected to the planter, arranged at a point intermediate the boots and spaced from said boots, and means operatively connecting said wheels and shaft for causing instantaneous movement of the shaft in one direction to cause simultaneous actuation of the valves each time said ground wheels rotate a predetermined degree as the planter moves forwardly.

11. In a planter, seed hoppers, seed plate gears arranged at the lower ends of the hoppers, a drill shaft, pinions on the drill shaft meshing with said gears for driving the latter, a clutch on said shaft, a trip arm cooperating with the clutch, a check shaft on which the trip arm is mounted, seed boots, valves in the boots for controlling the discharge of seed from the boots, means operatively connecting the check shaft to said valves for controlling the latter, auxiliary ground wheel means connected to the planter and adapted to turn due to contact with the ground as the planter moves forwardly, and means operatively connecting the wheel means and check shaft for causing instantaneous movement of the check shaft in one direction to cause actuation of the valves each time the ground wheel means rotates a predetermined degree as the planter moves forwardly.

12. The combination of a planter having seed hoppers, seed boots, upper and lower valves for controlling the discharge of seed from the boots, and a check shaft for controlling said valves, of auxiliary ground wheel means connected to the planter and adapted to turn due to contact with the ground as the planter moves forwardly, an energy-storing device operatively connected to the wheel means and adapted to store energy due to the rotation of the wheel means, and means operatively connecting the energy-storing means to the check shaft for causing instantaneous movement of the shaft to cause actuation of the valves each time the ground wheel means rotates a predetermined degree as the planter moves forwardly.

13. The combination of a planter having seed hoppers, speed boots, upper and lower valves for controlling the discharge of seed from the boots, and a check shaft for controlling said valves, of auxiliary ground wheel means connected to the planter and adapted to turn due to contact with the ground as the planter moves forwardly, an energy-storing device operatively connected to the wheel means and adapted to store energy due to the rotation of the wheel means, and means operatively connecting the energy-storing means to the check shaft for causing instantaneous movement of the shaft to cause actuation of the valves each time the ground wheel means rotates a predetermined degree as the planter moves forwardly, said energy-storing means comprising a spring.

14. The combination of a planter having seed hoppers, seed boots, upper and lower valves for controlling the discharge of seed from the boots and a check shaft controlling said valves, of auxiliary ground wheel means connected to the planter and adapted to turn due to contact with the ground as the planter moves forwardly, a first member movable in unison with the ground wheel means, a second member engageable by the first member and actuated by the latter for causing the second member to move in unison with the ground wheel means during a part of a cycle of the latter, energy-storing means operatively connected to the second member and adapted to store energy due to turning movement of the second member, and means operatively connecting the second member to the check shaft for controlling said valves and causing instantaneous movement of said shaft to cause actuation of the valves each time the ground wheel means rotates a predetermined degree as the planter moves forwardly.

15. The combination of a planter having seed hoppers, seed boots, upper and lower valves for controlling the discharge of seed from the boots and a check shaft controlling said valves, of auxiliary ground wheel means connected to the planter and adapted to turn due to contact with the ground as the planter moves forwardly, a first member movable in unison with the ground wheel means, a second member engageable by the first member and actuated by the latter for causing the second member to move in unison with the ground wheel means during a part of a cycle of the latter, energy-storing means operatively connected to the second member and adapted to store energy due to turning movement of the second member, and means operatively connecting the second member to the check shaft for controlling said valves and causing instantaneous movement of said shaft to cause actuation of the valves each time the ground wheel means rotates a predetermined degree as the planter moves forwardly, the first member being rotatable about an axis of rotation of the ground wheel means.

16. The combination of a planter having seed hoppers, seed boots, upper and lower valves for controlling the discharge of seed from the boots, and a check shaft controlling said valves, of auxiliary ground wheel means connected to the planter and adapted to turn due to contact with the ground as the planter moves forwardly, a first member movable in unison with the ground wheel means, a second member engageable by the first member and actuated by the latter for causing the second member to move in unison with the ground wheel means during a part of a cycle of the latter, energy-storing means operatively connected to the second member and adapted to store energy due to turning movement of the second member, and means operatively connecting the second member to the check shaft for controlling said valves and causing instantaneous movement of said shaft to cause actuation of the valves each time the ground wheel means rotates a predetermined degree as the planter moves forwardly, the second member being mounted to turn independently of the ground wheel means and first member during a portion of a revolution of the second member.

17. The combination of a planter having seed hoppers, seed boots, upper and lower valves for controlling the discharge of seed from the boots, and a check shaft controlling said valves, of auxiliary ground wheel means connected to the planter and adapted to turn due to contact with the ground as the planter moves forwardly, a first member movable in unison with the ground wheel means, a second member engageable by the first member and actuated by the latter for causing the second member to move in unison with the ground wheel means during a part of a cycle of the latter, energy-storing means operatively connected to the second member and adapted to store energy due to turning movement of the second member, and means operatively connecting the second member to the check shaft for controlling said valves and causing instantaneous movement of said shaft to cause actuation of the valves each time the ground wheel means rotates a predetermined degree as the planter moves forwardly, said energy-storing means comprising a coil spring.

18. The combination of a corn planter having seed hoppers, seed boots, upper and lower valves for controlling the discharge of seeds from the boots, and a check shaft for controlling said valves, of auxiliary ground wheel means connected to the planter and adapted to move due to contact with the ground as the planter moves forwardly, means comprising an energy-storing element, operatively connecting said wheel means and shaft for causing instantaneous movement of the shaft in one direction to cause actuation of the valves each time the ground wheel means moves a predetermined degree as the planter moves forwardly, and means cooperating with the ground wheel means for storing energy in said element during a portion of the time that said ground wheel means is moving such predetermined degree.

19. The combination of a corn planter having seed hoppers, seed boots, upper and lower valves for controlling the discharge of seeds from the boots, and a check shaft for controlling said valves, of auxiliary ground wheel means connected to the planter and adapted to turn due to contact with the ground as the planter moves forwardly, means comprising an energy-storing element, operatively connecting said wheel means and shaft for causing instantaneous movement of the shaft in one direction to cause actuation of the valves each time the ground wheel means rotates a predetermined degree as the planter moves forwardly, and means including a second energy-storing member cooperating with the ground wheel means for storing energy during a first approximately one hundred and eighty degrees rotation of said wheel means and for releasing such energy and assisting the ground wheel means in storing energy in the energy-storing element during the remaining approximately one hundred and eighty degrees rotation of the ground wheel means.

WILLIAM G. STEVENS, Jr.